(12) United States Patent
Chu et al.

(10) Patent No.: US 9,521,133 B2
(45) Date of Patent: Dec. 13, 2016

(54) MOVING TARGET DEFENSE AGAINST CROSS-SITE SCRIPTING

(71) Applicants: Bei-Tseng Chu, Charlotte, NC (US); Joe Portner, Charlotte, NC (US); Joel Kerr, Charlotte, NC (US); Ehab Al-Shaer, Charlotte, NC (US)

(72) Inventors: Bei-Tseng Chu, Charlotte, NC (US); Joe Portner, Charlotte, NC (US); Joel Kerr, Charlotte, NC (US); Ehab Al-Shaer, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 14/692,149

(22) Filed: Apr. 21, 2015

(65) Prior Publication Data
US 2015/0222657 A1 Aug. 6, 2015

Related U.S. Application Data

(63) Continuation of application No. 14/497,562, filed on Sep. 26, 2014, now Pat. No. 9,154,492.
(Continued)

(51) Int. Cl.
*H04L 29/06* (2006.01)
*H04L 29/08* (2006.01)
(Continued)

(52) U.S. Cl.
CPC ............. *H04L 63/08* (2013.01); *G06F 21/128* (2013.01); *G06F 21/566* (2013.01);
(Continued)

(58) Field of Classification Search
CPC ............. H04L 63/1441; H04L 67/1029; H04L 67/1031; G06F 21/128; G06F 21/51
See application file for complete search history.

(56) References Cited

U.S. PATENT DOCUMENTS

| | | | |
|---|---|---|---|
| 7,502,834 B2* | 3/2009 | Ehrich | H04L 67/02 709/217 |
| 7,987,268 B2* | 7/2011 | Chen | H04L 67/322 709/203 |

(Continued)

FOREIGN PATENT DOCUMENTS

| | | |
|---|---|---|
| CN | 1625121 A | 6/2005 |
| CN | 101964025 A | 2/2011 |
| CN | 101894237 B | 5/2012 |

OTHER PUBLICATIONS

Van Gundy, Matthew, and Hao Chen. "Noncespaces: Using randomization to defeat cross-site scripting attacks." computers & security 31.4 (2012): 612-628.*

(Continued)

*Primary Examiner* — James Turchen
(74) *Attorney, Agent, or Firm* — Clements Bernard PLLC; Christopher L. Bernard; Lawrence A. Baratta, Jr.

(57) ABSTRACT

A method, in a server, implementing a moving target defense against cross-site scripting includes receiving a request for a web page, wherein the server has N versions of the web page each with a mutated version of JavaScript; selecting a web page of the N versions; and sending an indication of the mutated version of JavaScript associated with the web page in response to the request. Another method, in a client device, using a moving target defense against cross-site scripting includes requesting a web page; receiving an indication of a mutated version of JavaScript for the web page; and adjusting a JavaScript interpreter based on the mutated version of JavaScript for the web page.

12 Claims, 5 Drawing Sheets

Related U.S. Application Data (60) Provisional application No. 61/883,536, filed on Sep. 27, 2013.

(51) Int. Cl.
  *G06F 21/12* (2013.01)
  *G06F 21/56* (2013.01)
  *G06F 21/57* (2013.01)
  *G06F 21/51* (2013.01)

(52) U.S. Cl.
  CPC .......... *G06F 21/567* (2013.01); *G06F 21/577* (2013.01); *H04L 63/1441* (2013.01); *H04L 63/1483* (2013.01); *H04L 67/02* (2013.01); *H04L 67/10* (2013.01); *H04L 67/1002* (2013.01); *H04L 67/1004* (2013.01); *G06F 21/51* (2013.01); *G06F 2221/2115* (2013.01); *G06F 2221/2119* (2013.01); *H04L 63/168* (2013.01); *H04L 67/1029* (2013.01); *H04L 67/1031* (2013.01)

(56) References Cited

U.S. PATENT DOCUMENTS

| | | | | |
|---|---|---|---|---|
| 8,191,041 | B2* | 5/2012 | Huang | G06F 8/423 717/115 |
| 8,533,261 | B2* | 9/2013 | Janedittakarn | H04L 63/08 709/203 |
| 8,578,482 | B1 | 11/2013 | Yang et al. | |
| 8,677,141 | B2 | 3/2014 | Erlingsson et al. | |
| 8,782,130 | B2* | 7/2014 | Wee | G06F 9/505 709/203 |
| 8,868,533 | B2* | 10/2014 | Powell | G06Q 30/0241 707/705 |
| 8,997,217 | B2* | 3/2015 | Aciicmez | G06F 21/53 715/200 |
| 2007/0107057 | A1* | 5/2007 | Chander | G06F 21/54 726/22 |
| 2008/0066173 | A1* | 3/2008 | Moran | H04L 63/101 726/12 |
| 2008/0222736 | A1* | 9/2008 | Boodaei | G06F 21/128 726/27 |
| 2008/0262828 | A1* | 10/2008 | Och | G06F 17/2818 704/3 |
| 2011/0185271 | A1* | 7/2011 | Aciicmez | G06F 21/563 715/234 |
| 2011/0252475 | A1* | 10/2011 | Mui | G06F 21/56 726/23 |
| 2011/0296381 | A1* | 12/2011 | Mooney | G06F 8/423 717/122 |
| 2012/0222117 | A1* | 8/2012 | Wong | H04L 63/02 726/23 |
| 2013/0132833 | A1 | 5/2013 | White et al. | |
| 2013/0139132 | A1* | 5/2013 | Kass | G06F 8/447 717/139 |
| 2014/0172871 | A1* | 6/2014 | Brayman | G06F 11/3664 707/741 |

OTHER PUBLICATIONS

Barua, Anton. "Protecting Browser Extensions from JavaScript Injection Attacks with Runtime Protection and Static Analysis." (2012).*
Gupta, Shashank, and Lalitsen Sharma. "Exploitation of cross-site scripting (XSS) vulnerability on real world web applications and its defense." International Journal of Computer Applications 60.14 (2012).*
Shahriar, Hossain, and Mohammad Zulkernine. "Mutec: Mutation-based testing of cross site scripting." Proceedings of the 2009 ICSE Workshop on Software Engineering for Secure Systems. IEEE Computer Society, 2009.*
Tang, Zhushou, et al. "L-WMxD: Lexical based webmail XSS discoverer." Computer Communications Workshops (INFOCOM WKSHPS), 2011 IEEE Conference on. IEEE, 2011.*
Protect Against Cross Site Scripting (XSS) Attacks; the Information Assurance Mission at NSA; Sep. 2011.*
Vogt, et al., "Cross-Site Scripting Prevention with Dynamic Data Tainting and Static Analysis," pp. 1-12.
Wassermann et al., "Static Detection of Cross-Site Scripting Vulnerabilities," University of California, May, 2008, pp. 1-10.
Okhravi et al., "Survey of Cyber Moving Targets," Technical Report 1166, Lincoln Laboratory Massachusetts Institute of Technology, Sep. 25, 2013, pp. 1-159.
Xie, et al., "ASIDE: IDE Support for Web Application Security," Department of Software and Information Systems, University of North Carolina at Charlotte, Dec. 2011, pp. 1-10.
"Content Security Policy 1.1," W3C Working Draft, Feb. 11, 2014, http://www.w3.org/TR/2014/WD-CSP11-20140211/.
Kc et al., "Countering Code-Injection Attacks With Instruction-Set Randomization," Oct. 2003, pp. 1-10.
Nadji et al., "Document Structure Integrity: A Robust Basis for Cross-site Scripting Defense," pp. 1-20.
Athanasopoulos et al., "An Architecture for Enforcing JavaScript Randomization in Web2.0 Applications (Short Paper)," Institute of Computer Science, Foundation for Research and Technology-Hellas, pp. 1-7.
"Security Headers on the Top 1,000,000 Websites: Mar. 2014 Report," Mar. 2014, pp. 1-14.
"2010 USENIX Conference on Web Application Development (WebApps '10)," USENIX, Jun. 2010, slides 1-98.
Athanasopoulos et al., "xJS: Practical XSS Prevention for Web Application Development," pp. 1-12.
"XSS (Cross Site Scripting) Prevention Cheat Sheet," Apr. 12, 2014, pp. 1-8.
"XSS Filter Evasion Cheat Sheet," Sep. 13, 2014, pp. 1-29.
Raman, Preeti, "JASPIN: Javascript Based Anomaly Detection of Cross-Site Scripting Attacks," Carleton University, Sep. 2008, pp. 1-122.
Phung et al., "Lightweight Self-Protecting JavaScript," Mar. 2009, pp. 1-14.
Barua, Anton, "Protecting Browser Extensions from JavaScript Injection Attacks with Runtime Protection and Static Analysis," Queen's University, Sep. 2012, pp. 1-150.
Gundy et al., "Noncespaces: Using Randomization to Enforce Information Flow Tracking and Thwart Cross-Site Scripting Attacks," University of California, pp. 1-13.
Kirda et al., "Noxes: A Client-Side Solution for Mitigating Cross-Site Scripting Attacks," Apr. 2006, pp. 1-8.
Bisht et al., "XSS-GUARD: Precise Dynamic Prevention of Cross-Site Scripting Attacks," Systems and Internet Security Lab, Department of Computer Science, University of Illinois, pp. 1-20.
Gundy et al., "Noncespaces: Using randomization to defeat cross-site scripting attacks," Computer and Security, 2012, pp. 1-13.
Barua, "Protecting Browser Extensions from JavaScript Injection Attacks with Runtime Protection and Static Analysis," Thesis, Queen's University, Sep. 2012, pp. 1-150.
West, "An Introduction to Content Security Policy," http://www.html5rocks.com/en/tutorials/security/content-security-policy/, Jun. 15, 2012, pp. 1-13.
Oct. 28, 2014 Office Action issued in U.S. Appl. No. 14/497,562.

* cited by examiner

```
<script>alert("<?php echo($var);?>")</script>
```
⇩ MUTATE TOKENS
```
<script>alert(1"<?php echo($var);?>")</script>
```
⇩ PHP
```
<script>alert(1"Hello, World!")</script>
```
⇩ CLIENT
```
<script>alert(1"Hello, World!")</script>
```

FIG. 5

```
<script>alert("<?php echo($var);?>")</script>
```
⇩ xJS
```
<script>vpSU1JTV2NHGwJyW/NHYA1CtVxFD</script>
```
⇩ PHP
```
<script>vpSU1JTV2NHGwJyW/NHYA1CtVxFD</script>
```
⇩ CLIENT
```
<script>alert("<?php echo($var);?>")</script>
```

MOVING TARGET DEFENSE AGAINST CROSS-SITE SCRIPTING

FIELD OF THE DISCLOSURE

The present non-provisional patent/patent application is a continuation of U.S. patent application Ser. No. 14/497,562 filed Sep. 26, 2014 and entitled "MOVING TARGET DEFENSE AGAINST CROSS-SITE SCRIPTING," which claims priority to U.S. Provisional Patent Ser. No. 61/883, 536 filed Sep. 27, 2013 and entitled "COMPUTER IMPLEMENTED METHODS AND SYSTEMS PROVIDING MOVING TARGET DEFENSE AGAINST CROSS-SITE SCRIPTING," the contents of which are incorporated by reference herein.

FIELD OF THE DISCLOSURE

The present disclosure relates generally to security in computer networking systems and methods. More particularly, the present disclosure relates to a moving target defense against cross-site scripting (XSS).

BACKGROUND OF THE DISCLOSURE

Cross-site scripting (XSS) is a widespread web-based attack technique and has been a leading web attach vector for some time. A web site with XSS vulnerability can be exploited by a malicious attacker to launch serious attacks against it, a company's computer network, as well as its customers. This can lead to loss of confidential information, identity theft, and/or installation of viruses and Trojans, even reaching behind corporate firewalls.

XSS attacks stem from a web design feature: there is no clear demarcation separating JavaScript programs from other web data such as Hypertext Markup Language (HTML) and Cascading Style Sheets (CSS) data streams. A typical web page uses format definition languages (e.g. HTML, CSS) to specify page layout (e.g. tables, placement of pictures), as well a programming language to define certain behavior of the web page (e.g. what happens when a mouse is clicked). JavaScript programs can be intermixed with other web data in very complicated ways, affording malicious JavaScript programs to be injected into a legitimate web data stream and cause malicious logic to be executed on a client device. An XSS attack exploits design flaws in the web page by injecting a malicious JavaScript program to the vulnerable web page, thereby making the web page exhibit malicious behavior. Unfortunately, there is no easy way to prevent all XSS attacks. The best practice is to encourage developers to sanitize untrusted data before placing them into the web stream. However, there is no one-size-fit-all solution to perform whitelist-based data sanitization for web data streams that can prevent XSS attacks while preserving legitimate web functions.

State of the Art XSS prevention falls into two categories: 1) defensive web programming, and 2) using Content Security Policy (CSP) compatible browsers. Defensive web programming (as exemplified by the programming guidelines offered by the Open Web Application Project, www.owasp.org) focuses on educating web site developers to properly sanitize untrusted dynamic web content to prevent XSS. Because many web sites are very complex, mistakes are difficult to avoid entirely, as evidenced by the large number of XSS vulnerabilities reported (e.g. www.xssed.com).

Content Security Policy (CSP) is a proposal to combat XSS is part of the Content Security Policy (CSP) introduced by the Mozilla Foundation in Firefox 4 and adopted as a W3C candidate in 2012. It mitigates XSS attacks by prohibiting in-line JavaScript execution in the browser. All major browsers are supporting it today. XSS protection is one of the major goals of CSP. It can be summarized by the following four components: (1) New versions of CSP-compliant browsers must be used; (2) CSP assumes legitimate JavaScript programs can be enumerated before run time; (3) Dynamic evaluation of JavaScript programs using the "eval" function is not permitted; and (4) No inline JavaScript programs are permitted. All legitimate JavaScript programs must be contained in dedicated files. The website will instruct a CSP-compliant browser to load approved JavaScript files from approved web locations. By banning inline JavaScript programs, CSP achieves a clear separation of JavaScript programs from other web data stream. The requirement that all in-line JavaScript code must be "pulled out" and placed in trusted directories poses a significant challenge to most web sites as JavaScript are often interlaced with web content and format specifications. This effort, particularly the effort required to test the restructured web site, is often prohibitively expensive in practice. Because most web sites are incrementally built upon existing code, it is very difficult to take advantage of the benefit of CSP. The adoption rate for CSP has therefore been extremely low.

There is therefore a need in the field for new computer implemented methods and systems to prevent cross-site scripting vulnerabilities.

BRIEF SUMMARY OF THE DISCLOSURE

In an exemplary embodiment, a method, in a server, implementing a moving target defense against cross-site scripting includes receiving a request for a web page, wherein the server has N versions of the web page each with a mutated version of JavaScript; selecting a web page of the N versions; and sending an indication of the mutated version of JavaScript associated with the web page in response to the request. The mutated version of JavaScript can include changing one or more lexical tokens associated with JavaScript, with the one or more lexical tokens selected based on use in malicious JavaScript attacks. The one or more lexical tokens can be a left parenthesis and assignment operator. The selecting can be random, and the web page can be replaced every M minutes. The method can further include utilizing load balancing for the N versions. The N versions can be mutated off-line to avoid run time penalties. The method can further include receiving an indication of a violation including JavaScript not conforming to the mutated version of JavaScript associated with the web page. The indication can include a page on which the violation occurred, the page's referrer, a resource that violated the page's policy, and a specific directive of the violation.

In another exemplary embodiment, a method, in a client device, using a moving target defense against cross-site scripting includes requesting a web page; receiving an indication of a mutated version of JavaScript for the web page; and adjusting a JavaScript interpreter based on the mutated version of JavaScript for the web page. The mutated version of JavaScript can include changing one or more lexical tokens associated with JavaScript, with the one or more lexical tokens selected based on use in malicious JavaScript attacks. The one or more lexical tokens can be a left parenthesis and assignment operator. The mutated version of JavaScript can be randomly selected by a server for the web page, and the web page is replaced every M minutes. The method can further include detecting a violation associated with the web page including JavaScript not conforming to the mutated version of JavaScript; and disarming JavaScript associated with the violation and/or reporting the violation to a server associated with the web page. The reporting can include a page on which the violation occurred, the page's referrer, a resource that violated the page's policy, and a specific directive of the violation.

In a further exemplary embodiment, a system implementing a moving target defense against cross-site scripting includes a network interface communicatively coupled to a network; a data store storing N versions of a web page each with a mutated version of JavaScript; a processor communicatively coupled to the network interface and the data store; and memory storing instructions that, when executed, cause the processor to: receive a request for the web page from the network interface; select one of the N versions; and send an indication of the mutated version of JavaScript associated with one of the N versions in response to the request. The mutated version of JavaScript can include changing one or more lexical tokens associated with JavaScript, with the one or more lexical tokens selected based on use in malicious JavaScript attacks. The one or more lexical tokens can be a left parenthesis and assignment operator. The one of the N versions can be randomly selected, and the web page is replaced every M minutes. The system can further include a load balancer configured to assist in selecting the one of the N versions. The N versions can be mutated off-line to avoid run time penalties.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a moving target defense against cross-site scripting (XSS) is described to defend against XSS attacks. Generally, the moving target defense is based on mutating symbols in the JavaScript language and leveraging commonly used load-balancing mechanisms to deliver multiple copies of a website using different versions of the JavaScript language. A XSS attack that injects unauthorized JavaScript code can thus be easily detected. This solution achieves similar benefits in XSS protection as Content Security Policy (CSP), a leading web standard to prevent cross site scripting, but can be much more easily adopted because refactoring of websites is not required.

Again, the approach described herein is based the principle of moving target defense, to mitigate XSS attacks with CSP-like benefits without the requirement of refactoring JavaScript programs in existing websites. This approach, referred to as the moving target defense against XSS (MDX), shares the same first three assumptions as CSP but allows inline JavaScript programs. That is, the moving target defense includes (1) New versions of CSP-compliant browsers must be used; (2) CSP assumes legitimate JavaScript programs can be enumerated before run time; and (3) Dynamic evaluation of JavaScript programs using the "eval" function is not permitted, but does not require removal of inline JavaScript programs.

The moving target defense creates randomly mutated versions of the JavaScript language. A server implementing the moving target defense will maintain multiple copies of a website, each with a different version of JavaScript. For a given web page request, a random version will be served. The server will inform a compliant browser the version of the mutated JavaScript language it should use. Injected JavaScript programs will fail because it cannot predict the version of JavaScript at run time. A moving target defense-compliant browser will report back any instances of JavaScript programs not using the agreed upon mutation. These instances suggest website vulnerabilities that should be fixed.

The terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art, and the present disclosure and will not be interpreted in an idealized or overly formal sense unless expressly so defined herein.

In the descriptions herein, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the moving target defense and the claims. In the following description, for purposes of explanation, numerous specific details are set forth in order to provide a thorough understanding of the moving target defense. It will be evident, however, to one skilled in the art that the moving target defense may be practiced without these specific details.

Exemplary Network

Figure 1:
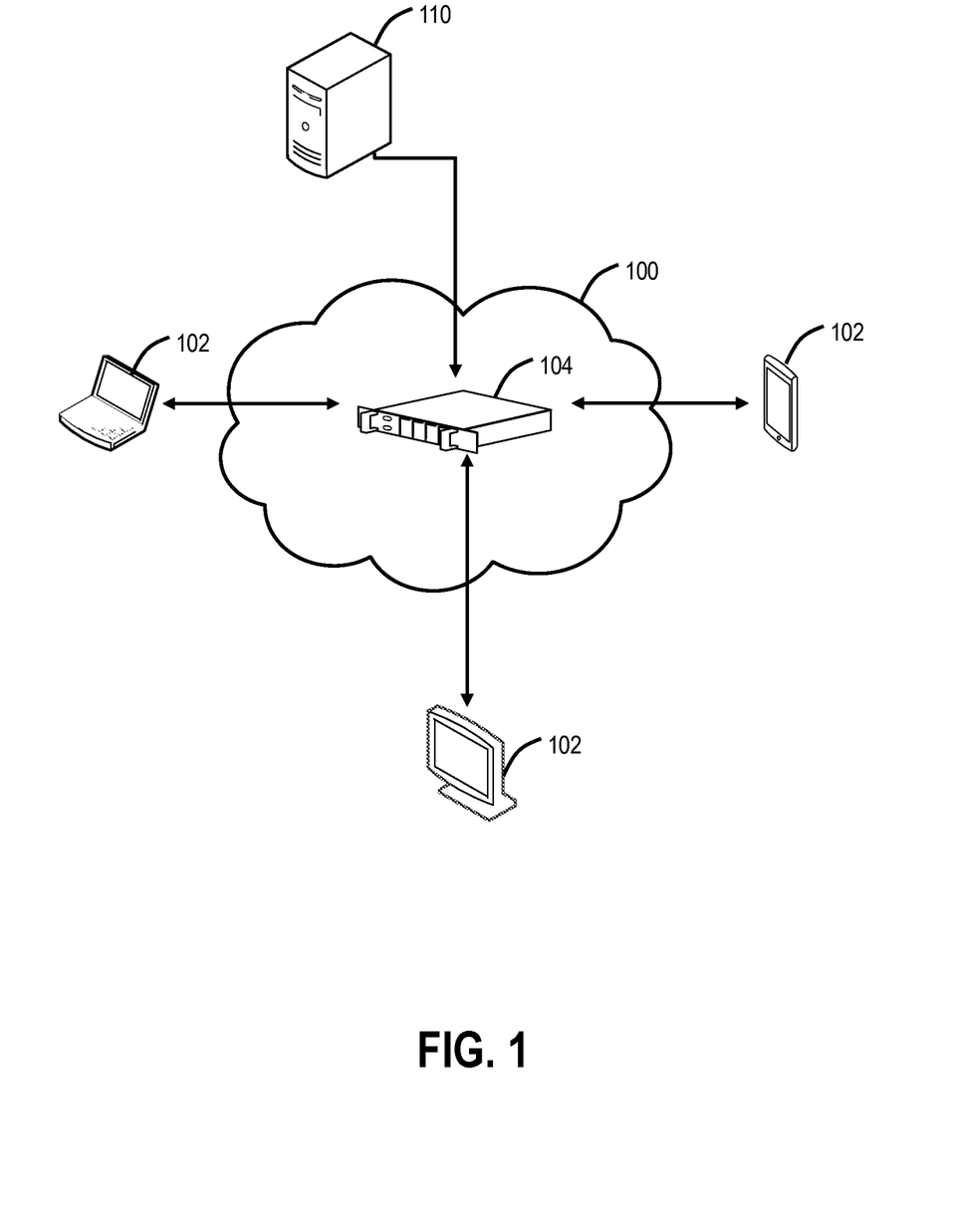
FIG. 1 is a network diagram of a network for implementing the moving target defense.

Referring to FIG. 1, in an exemplary embodiment, a network diagram illustrates a network 100 for implementing the moving target defense. The network 100 is generally any infrastructure capable of connecting two or more devices 102, such as client devices, either using wires or wirelessly allowing them to transmit and receive data. Non-limiting examples of data networks may include the Internet, Wide Area Networks (WANs), Local Area Networks (LANs), Wireless WANs, Wireless LANs, Virtual Private Networks (VPNs), and combinations thereof. The devices 102 can be referred to client devices, electronic devices, mobile devices, computers, tablets, etc. Non-limiting examples of the devices 102 include personal computers (PCs), workstations, laptops, tablet PCs including the iPad, cell phones including iOS phones made by Apple Inc., Android OS phones, Microsoft OS phones, Blackberry phones, or generally any device capable of running computer software and displaying information to a user. Certain types of client devices which are portable and easily carried by a person from one location to another may sometimes be referred to as a "mobile device". Some non-limiting examples of mobile devices include; cell phones, smart phones, tablet computers, laptop computers, wearable computers such as watches, Google Glasses, etc. and the like.

The devices 102 connect, through the network 100, to a load balancing server 104 which is configured to service web pages from one or more servers 110. The servers 104, 110 are machines, apparatuses, or devices that are capable of accepting and performing logic operations from software code. The term "software", "software code" or "computer software" refers to any set of instructions operable to cause a computer to perform an operation. Software code may be operated on by a "rules engine" or processor. Thus, the methods and systems may be performed by a computer based on instructions received by computer software. The servers 104, 110 can include a database which is a digital collection of data or information. The moving target defense uses novel methods and processes to store, link, and modify information. For the purposes of the present disclosure, a database may be stored on a remote server and accessed by the devices 102 through the network 100 (i.e., the database is in the cloud) or alternatively in some embodiments the database may be stored on the client device or remote computer itself (i.e., local storage). A "data store" as used herein may contain or include a database (i.e. information and data from a database may be recorded in a medium on a data store). The present disclosure is to be considered as an exemplification of the moving target defense, and is not intended to limit the moving target defense to the specific embodiments illustrated by the figures or description herein.

CSP Compliance

To execute a JavaScript program, a CSP-compliant site will use:

```
script-src www.acmecorp.com;
<script src="https://www.acmecorp.com/main.js"/>
```

The first line is a CSP directive indicating that JavaScript programs can be served from www.acmecorp.com. The second line invokes a particular JavaScript program from the whitelisted source. CSP has a built in XSS detection mechanism. If an inline JavaScript program is detected, a CSP-compliant browser will report this event back to the server as an indication of malicious attack behavior.

No major objections have been raised against the first three components of CSP. Legitimate JavaScript programs in most web sites reside in either static files (e.g. HTML, .CSS, .PHP, .JSP, .ASPX) or content management system databases that do not change after deployment. Dynamic contents often come from either business databases (e.g. orders, accounts) or user input. They typically do not contain JavaScript programs. XSS attacks target vulnerabilities in server side scripts written in languages such as PHP, ASP, Java, and JSP.

The fourth component of CSP presents the most challenge for its wide adoption. Many small JavaScript programs are often tightly integrated into web pages as illustrated by the following example.

<type="text" name="email" onkeyup="doX(arg1, arg2)">

In this case a JavaScript function doX( ) is called whenever a key is released in the text box. If one were to disable inline JavaScript programs, one must refactor the web page and move this JavaScript program out of the html file. It is a formidable task for any large website to pull out many small snippets of JavaScript code into different files. It is equally difficult to maintain such a website as these scripts will not be directly visible to a developer in the files that they are used in. The developer is forced to open separate files to view/modify a few lines of code. It is not surprising that despite efforts by browser vendors to support CSP, a 2014 study by Veracode indicated only 355 of the top 1 million Alexa web sites have adopted CSP (described in I. Dawson, "Security Headers on the Top 1,000,000 Websites: March 2014 Report," 19 Mar. 2014. Available online at blog.veracode.com/2014/03/security-headers-on-the-top-1000000-websites-march-2014-report/).

Even for those adopting CSP, they often continue to enable inline JavaScript programs for reasons described herein. Therefore, in practice, even the limited adoption of CSP is for reasons other than XSS protection.

Moving Target Defense Against XSS

In various exemplary embodiments, the moving target defense mitigates XSS attacks with CSP-like benefits without the requirement of refactoring JavaScript programs in existing websites. This approach, referred to as the moving target defense against XSS (MDX), shares the same first three assumptions as CSP but allows inline JavaScript programs. Instead, the moving target defense creates randomly mutated versions of the JavaScript language for a same web page. A server implementing the moving target defense maintains multiple mutated copies of a website, each with a different version of JavaScript. For a given web page request, a random mutated version is served. The server informs a compliant browser the version of the mutated JavaScript language it should use. Injected JavaScript programs will fail because it cannot predict the version of JavaScript at run time. A moving target defense-compliant browser can report back any instances of JavaScript programs not using the agreed upon mutation. These instances suggest website vulnerabilities that should be fixed.

JavaScript Language Mutation

XSS attacks include injected code that modifies either state or behavior of a web page. If one can defend a script from both unwanted state change and behavior, one can defeat XSS attacks. To modify the behavior of a page, an attacker must use JavaScript functions, or Application Programming Interfaces (APIs). For example, an attack script can inject page elements as shown below:

node.appendChild(newNode);

This particular attack would add the "newNode" object as a child to the "node" object. In order to make API calls, a script must use the parentheses ( ). For the moving target defense, one of these tokens can be mutated, for instance, the left parenthesis—in whitelisted JavaScript programs. The above example JavaScript program can be mutated into, for example:

node.appendChild(123newNode);

Here the string "(123" will be interpreted by JavaScript interpreter as a single token representing the left parenthesis. By taking away an attacker's ability to use the left parenthesis, they are not able to attack page behavior. Only left parentheses that are syntactically correct (i.e., appropriately mutated) will be executed successfully.

To manipulate page state (without using API functions), the attackers must use the assignment operator. The browser and Document Object Model (DOM) objects provide access to key state objects that attackers could manipulate. An example of an XSS attack that manipulates page state is shown below:

location="evil.com";

We can mutate the "=" token in whitelisted JavaScript programs. Again, the above example becomes:

location=123 "evil.com";

Similarly, here the string "=123" is interpreted by the JavaScript interpreter as the token for assignment operator. That is, "=123" is viewed as "=".

For the moving target defense, limiting mutation to these two tokens (the left parenthesis and assignment operator) simplifies the mutation process and keeps computation resource requirements low. Selection of these two tokens is based on the observation that any attack would require the use of one or both of these tokens. Note, it is acknowledged that there is potential for an attacker to use a different JavaScript language feature to launch a successful XSS attack, i.e. one that does not include these two tokens; however, if it was discovered that another token could be used to manipulate behavior or state, the moving target defense could be extended to include another token. Additionally, because the tokens themselves are being changed, filter evasion techniques, like encoding, redirection, etc., will not be successful either.

Moving Target Defense Deployment

Figure 2:
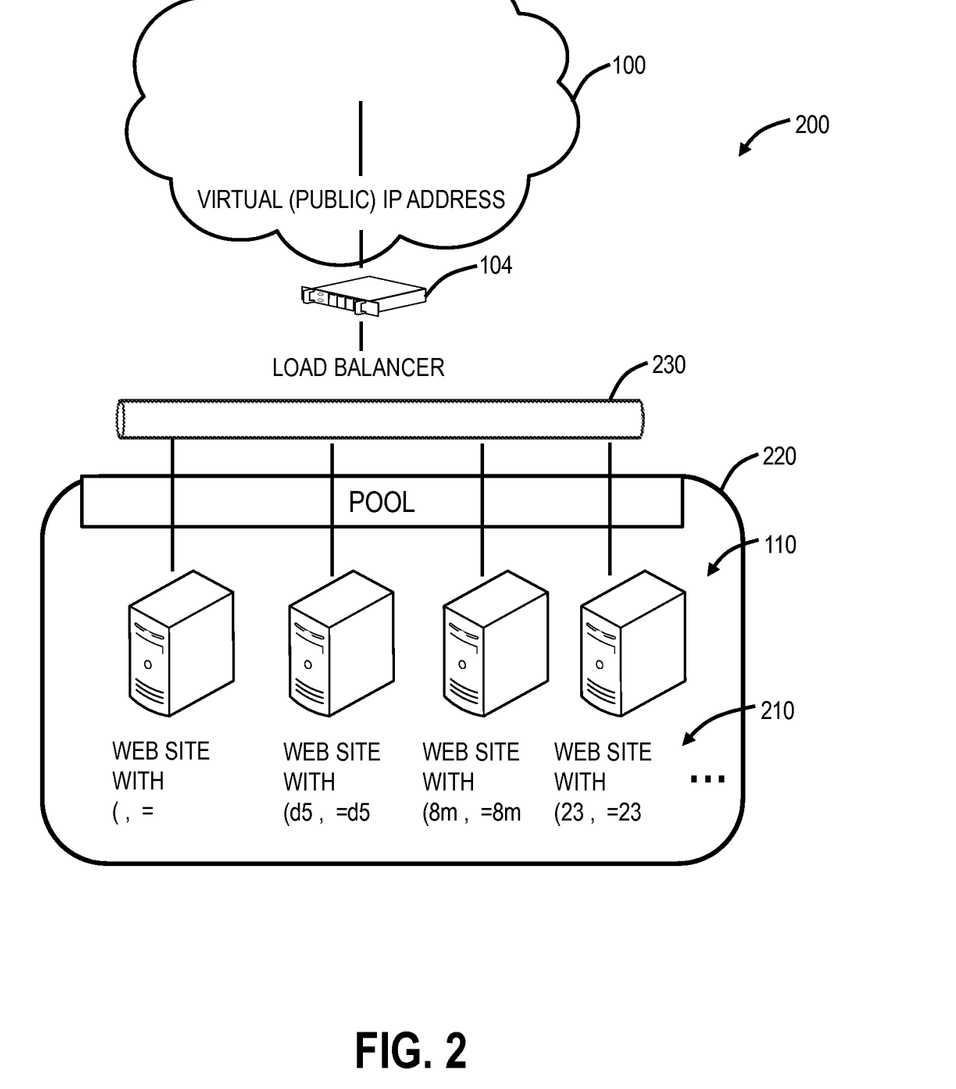
FIG. 2 is a network diagram of a moving target defense system.

Referring to FIG. 2, in an exemplary embodiment, a network diagram illustrates a moving target defense system 200. The moving target defense system 200 includes the load balancing server 104 coupled to the network 100, serving web sites 210 (or web pages) from the one or more servers 110. The web sites 210, provided by the one or more servers 110, are in a pool 220 that connects to the load balancing server 104 via a network 230 (such as LAN, etc.) For the moving target defense system 200, multiple versions of the web site 230 will be served, each using a different mutated version of the JavaScript language. For a given web request, one of the mutated versions can be picked randomly. This scheme fits nicely into most practical settings as web sites are often replicated for load balancing.

For example, assume there are N copies of the web sites 210, i.e. N different mutated versions. For example, different mutated versions could be:

|        | Lexical token "(" | Lexical token "=" |
|--------|-------------------|-------------------|
| Copy 1 | (                 | =                 |
| Copy 2 | (d5               | =d5               |
| Copy 3 | (8m               | =8m               |
| ...    | ...               | ...               |
| Copy N | (23               | =23               |

Assume, for example, the N copies of the web sites 210 are replaced every M minutes (e.g., 10 copies replaced every hour, etc.). The moving target defense system 200 has a large space for tokens (e.g. no repetition for at least a month). For example, using the lexical token plus two additional characters—either a letter or number, there can be 67,600 tokens (26*10*26*10). The probability of a successful attack is 1/N within M minutes and the probability of vulnerability detection is $1-(1/N)^k$ for k repeated attacks. For example, for N=10, k=10, probability of detection is 0.999999999.

Figure 3:
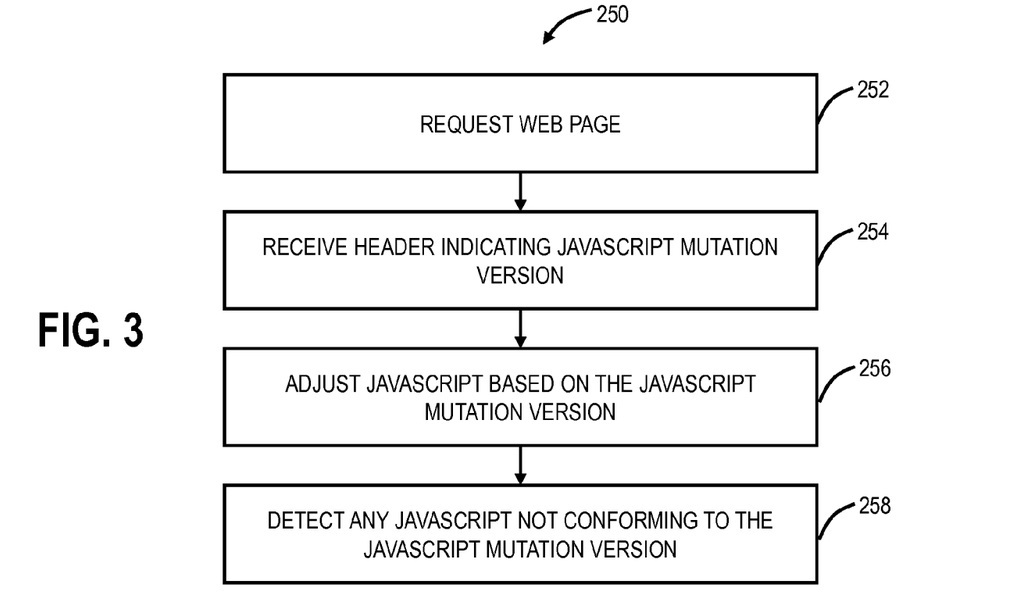
FIG. 3 is a flow chart of a moving target defense client process.

Referring to FIG. 3, in an exemplary embodiment, a flow chart illustrates a moving target defense client process 250. The moving target defense client process 250 can be implemented in one of the devices 102 communicating with one of the servers 110 in the network 100. Again, the moving target defense client process 250 is a novel computer implemented method to prevent cross-site scripting vulnerabilities by providing a moving target defense process (MTD) against XSS attacks. The moving target defense cause web browsers, at the device 102, to switch to a randomly chosen mutated version of the JavaScript programming language every time a web page is displayed. This makes the attacker unable to write an attack JavaScript as he/she does not know which variety of JavaScript the browser will be using when the malicious program is rendered.

The moving target defense client process 250 includes requesting a web page (step 252). The request for the web page can be performed through a client web browser on the device 102. The moving target defense client process 250 includes receiving a header indicating a JavaScript mutation version (step 254). Again, the JavaScript mutation version indicates what constitutes the "(" and "=" lexical tokens. The moving target defense client process 250 includes adjusting JavaScript, at the client device 102, based on the JavaScript mutation version (step 256). Finally, the moving target defense client process 250 includes detecting any JavaScript not conforming to the JavaScript mutation version (step 258). Also, based on the detecting, the device 102 implementing the moving target defense client process 250 can prohibit execution of the JavaScript not conforming to the JavaScript mutation version and alerting a server associated with the web page.

Figure 4:
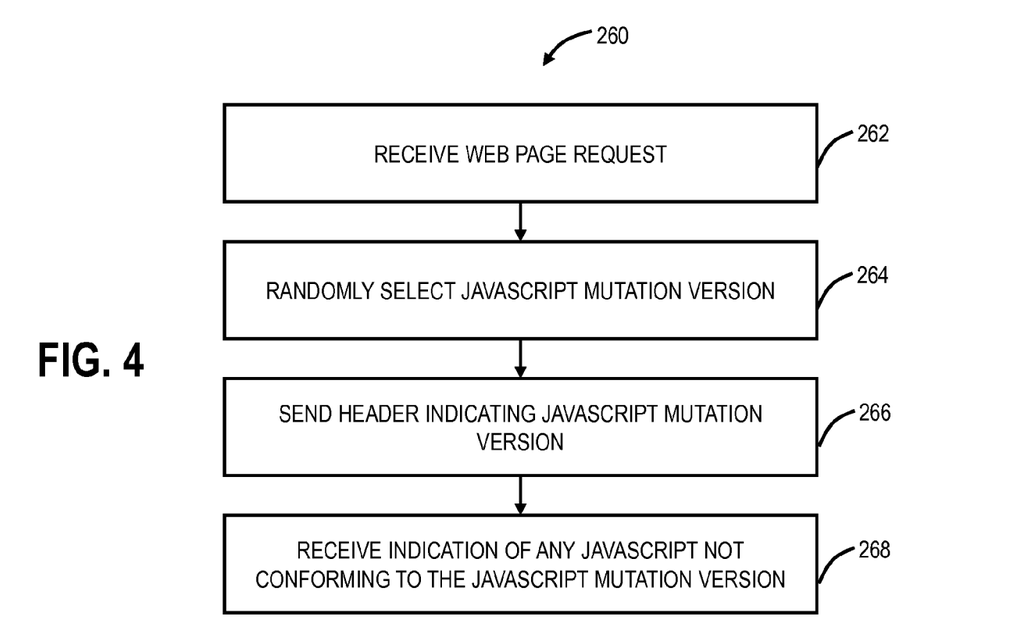
FIG. 4 is a flow chart of a moving target defense server process.

Referring to FIG. 4, in an exemplary embodiment, a flow chart illustrates a moving target defense server process 260. The moving target defense server process 260 can be implemented in one of the servers 110 communicating with one of the devices 102 in the network 100. The moving target defense server process 260 can be implemented in conjunction with the moving target defense client process 250. The moving target defense server process 260 includes receiving a web page request (step 262). This can also include load balancing. The moving target defense server process 260 includes randomly selecting a JavaScript mutation version (step 264). Again, the JavaScript mutation version indicates what constitutes the "(" and "=" lexical tokens. The moving target defense server process 260 includes sending a header indicating the JavaScript mutation version to the device 102 requesting the web page (step 266). The moving target defense server process 260 includes receiving an indication of any JavaScript not conforming to the indicated JavaScript mutation version (step 268).

The processes 250, 260 are based on the observations that JavaScript programs for the vast majority of web sites are statically coded. It is very rare that a web site writes a JavaScript program that generates another JavaScript program at run time. Therefore, a web server (e.g. one serves HyperText Markup Language (HTML), PHP programs, JavaServer Pages (JSP) programs, Active Server Pages (ASP) programs) can identify static JavaScript programs on the web site and mutate the syntax of these JavaScript programs. Attack scripts generally come from content at run time and thus will not be so mutated.

In various exemplary embodiments described herein, mutation of a JavaScript program is accomplished by changing the lexical tokens "(" and "=." However, mutation of a JavaScript program may be accomplished by changing any program key words (e.g. "if" can be mutated to "if_1345") as well as standard library function names (e.g. "onmouseclick" to "onmouseclick_1345"). Compatible web browser and the server can establish an agreement as to what version of mutated JavaScript will be served by the server when the page is served. In cases where the browser and the server are incompatible, no mutation of JavaScript will be performed and the web page will be served according to current web standards. Thus the scheme can achieve backward compatibility easily as well as require minimal changes in existing systems.

Under the processes 250, 260, for each instance of web connection between a browser and a web server, the two parties will negotiate for a different variety of JavaScript. Since the malicious script does not exist as static programs on the server, they will not be mutated and thus will be "disarmed," i.e. not run. Furthermore, the browser will be able to detect "malicious scripts", those JavaScript that are not mutated properly, easily and report back to the server so that vulnerable web pages can be corrected. Again, the processes 250, 260 are only implemented if both the server and the browser support such functionality. If not, web page service reverts to standard implementations.

For the server, static JavaScript includes JavaScript included in files from the server (e.g. files with extensions .HML, .JS, .CSS, .PHP, .JSP, .ASP, etc.) for a web page designed with a content management system, one can specify database stores (e.g. specific tables) where JavaScript may be found. The server can mutate these JavaScript when reading contents out of these tables. The advantage of the processes 250, 260 for preventing XSS is that it only requires changes to web servers and browsers. These changes can be gradually rolled out as upgrades to new versions of servers and browsers. The vast majority of websites will be able to take advantage of this approach without changing any code or the way web developers build web sites.

JavaScript Language Mutation for Web Sites

Whitelisted JavaScript programs on the web site 210 can be mutated offline by a process that scans web content (e.g. files with extensions such as .HTML, .PHP, .JSP, .ASPX, AND.CSS, as well as databases used by a content management system), to identify JavaScript programs, and mutate the tokens for left parenthesis and the assignment operator. Also, this process can be implemented online or at run time. When the web page is served, part of the header informs a moving target defense compliant browser of the particular version of JavaScript being used. This is accomplished by passing a string that represents the mutated left parenthesis and assignment operator. The browser passes the mutated tokens to its JavaScript engine to interpret JavaScript programs.

Figure 5:
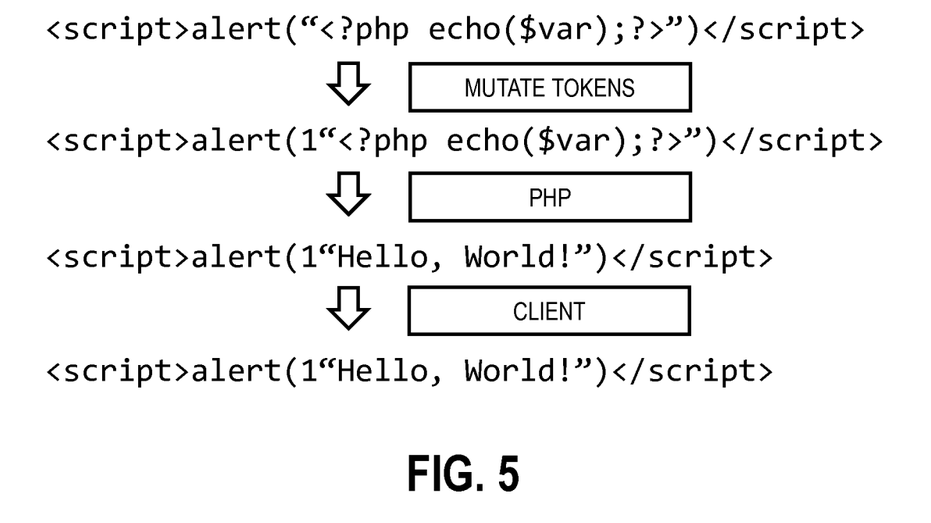
FIG. 5 is a flow diagram with code of a JavaScript mutation.

Referring to FIG. 5, in an exemplary embodiment, a flow diagram with code illustrates a JavaScript mutation 270. Here, "(" is mutated to "(1" in a PHP file and interpreted as such by a client instructed accordingly. Backwards compatibility can easily be maintained. If a request is made from a browser not supporting the moving target defense, then the request can be redirected to an unmodified version of the site. Similar to CSP, a moving target defense-compliant browser will report JavaScript violations back to the server so XSS vulnerabilities can be identified. These reports include: the page on which the violation occurred, the page's referrer, the resource that violated the page's policy, and the specific directive it violated. Thus, the reported vulnerabilities can be fixed in a timely manner.

Again, with the moving target defense, the odds are greatly in favor of the defenders. Suppose N copies of the web site are deployed at any given time. An attacker might be able to discover all versions of JavaScript available at any given moment. The attacker can craft an attack with a probability of 1/N being successful. The probability of the attack failing, thus leading to vulnerability discovery, is 1−1/N. For example, if 10 website copies are deployed the probability of a successful attack is 10%. For any attack, its probability of being discovered is 90%.

Each cross site scripting attack is likely to be carried out multiple times. For example, XSS attack may involve sending a mass email with a malicious JavaScript program embedded in a link. If k attacks occur, the probability of all k attacks being successful is $(1/N)^k$. The probability of at least one attack failing—leading to the detection of the vulnerability—is $1-(1/N)^k$. Continuing with the email attack example, if 10 attack links were clicked, the probability of XSS vulnerability detection would be $1-(1/10)^{10}$, or 0.999999999. Of course, increasing the number of mutations only improves the odds in the defender's favor.

Browser Implementation

A proof of concept implementation was implemented to modify an open source browser to support the moving target device. A modified JavaScript engine inside WebKit was modified by statically changing JavaScript tokens for the left parenthesis and assignment operators. The modified WebKit JavaScript engine was tested with a modified version of the Safari browser it was determined to work as planned. All known filter evasion XSS attacks were defeated by the modified browser. Additional browser implementation can include (1) having the browser dynamically change the symbol table used by the lexical analyzer of the JavaScript interpreter and (2) making each tab of the browser work with different versions of the lexical analyzer table within the JavaScript interpreter.

XSS Discussion

Much research into preventing XSS attacks has focused on offline taint analysis based on server side source code. However, it is difficult to fix all XSS vulnerabilities using program analysis in practice because of high false positives that are generated. Space limitation does not permit us to reference other research proposals to protect XSS attacks at run time. Most mechanism to protect against XSS at run time are heuristics based. The moving target defense described herein does not rely on any heuristics. However, parsing all web streams on a web server to randomize JavaScript programs upon every page load introduces a prohibitive run time overhead.

Figure 6:
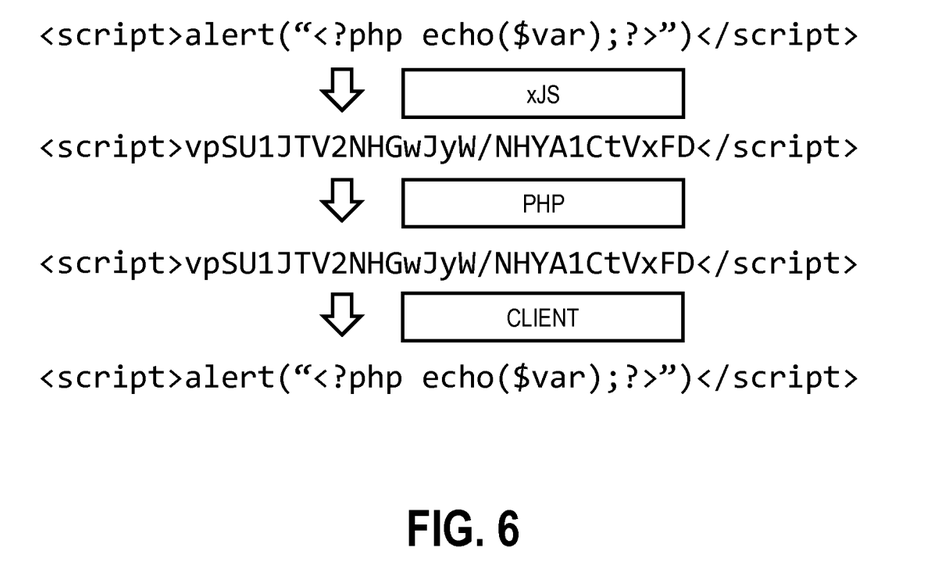
FIG. 6 is a flow diagram with code of XORing JavaScript programs with a random key.

To minimize performance overhead, xJS was proposed, in E. Athanasopoulos et al. "xJS: Practical XSS Prevention for Web Application Development," in 2010 USENIX Conference on Web Application Development, 2010, to counter XSS in such way that one does not need to run JavaScript parsing on the web server. All JavaScript programs are encoded by XORing them with a random key which will be decoded by a browser plugin by XORing again with the same key. This key can be exchanged as part of responses to a web request. This approach has the advantage of not requiring browser modifications. The main drawback of this approach, however, is that it does not accommodate server side scripts. It is common for JavaScript programs to contain host variables, which will be dynamically replaced with content by a server side script (e.g. PHP). By XORing all JavaScript programs blindly, xJS breaks such behavior as illustrated in FIG. 6 which is a flow diagram with code of XORing JavaScript programs with a random key.

In contrast, the moving target defense preserves all server side script functions as illustrated in FIG. 5. Unlike E. Athanasopoulos et al., the moving target defense can mutate JavaScript programs offline. This has the advantage of avoiding run time performance penalty. Although an attacker can still craft JavaScript code to attack a specific version of the JavaScript language, such an attempt will likely to fail because the version of JavaScript language served is chosen randomly from a (potentially large) number of options, which is accomplished by leveraging commonly used load-balancing features. Furthermore XSS vulnerabilities can be discovered quickly with very high probability.

In summary, the moving target defense is a promising new approach to defend against XSS attacks without requiring people to change their existing websites. It can be deployed efficiently by leveraging existing web delivery infrastructures without performance penalties. The moving target defense is highly scalable, enabling those with more computing resources to offer better protection against XSS attacks by deploying more website copies.

Exemplary Server Architecture

Figure 7:
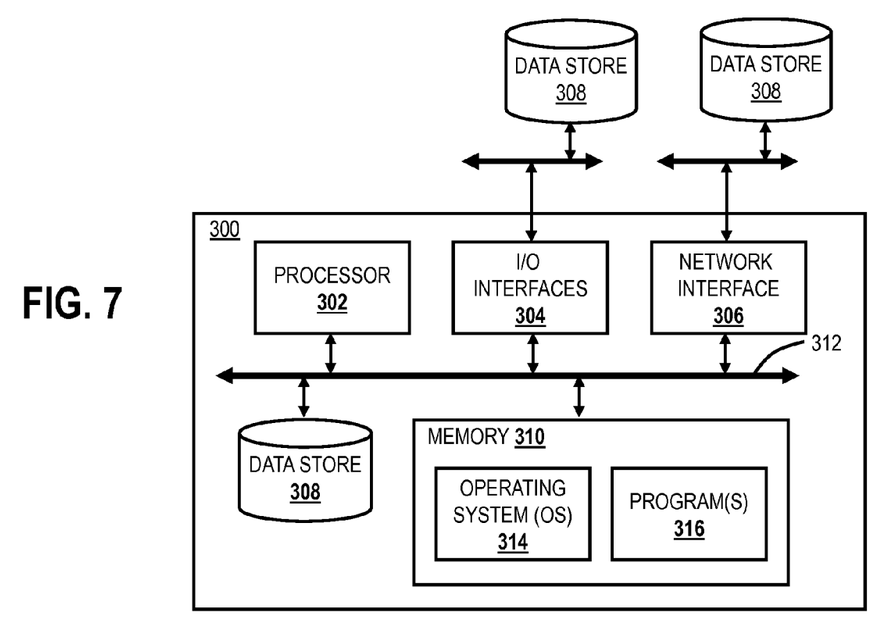
FIG. 7 is a block diagram a server which can be used for any of the servers described herein.

Referring to FIG. 7, in an exemplary embodiment, a block diagram illustrates a server 300 which can be used for any of the servers 104, 110 described herein. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 7 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications between the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 101, the enterprise 200, and the like, etc. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally, in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered list of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Exemplary Mobile Device Architecture

Figure 8:
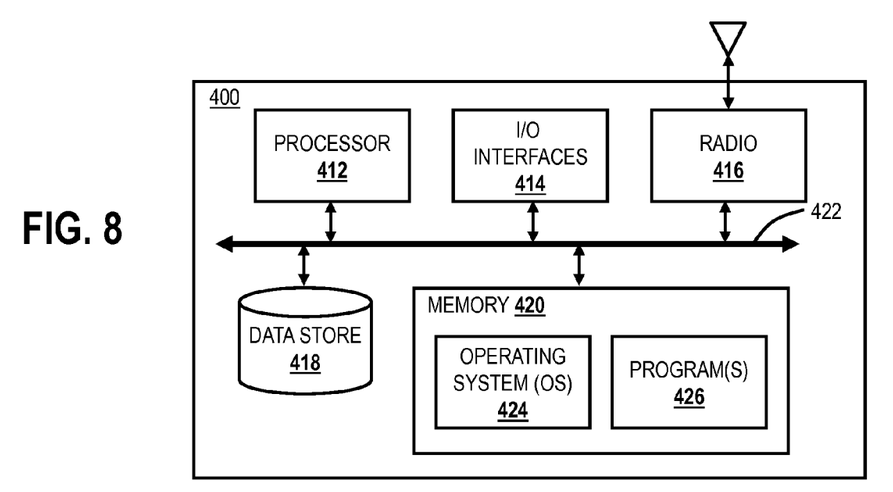
FIG. 8 is a block diagram of a mobile device which can be used for the client devices described herein.

Referring to FIG. 8, in an exemplary embodiment, a block diagram illustrates a mobile device 400 which can be used for the client devices 102 described herein. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 8 depicts the mobile device 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example, but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications between the aforementioned components.

The processor 412 is a hardware device for executing software instructions. The processor 412 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 412 is configured to execute software stored within the memory 422, to communicate data to and from the memory 422, and to generally control operations of the mobile device 400 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered list of executable instructions for implementing logical functions. In the example of FIG. 8, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 400. For example, exemplary programs 428 can include, but not limited to, a web browser, social networking applications, streaming media applications, games, mapping and location applications, electronic mail applications, financial applications, and the like.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Additionally, the logic flows and structure block diagrams described herein, which describe particular methods and/or the corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of nonvolatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the moving target defense may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the moving target defense in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the moving target defense and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the moving target defense includes software for controlling the computer system, for driving a device or devices for implementing the moving target defense, and for enabling the computer system to interact with a human user. Such software may include, but is not limited to, device drivers, operating systems, development tools, and applications software. Such computer readable media further includes the computer program product of the moving target defense for performing all or a portion (if processing is distributed) of the processing performed in implementing the moving target defense.

The computer code or software code of the moving target defense may be any interpretable or executable code mechanism, including but not limited to scripts, interpretable programs, dynamic link libraries (DLLs), Java classes, and complete executable programs. Moreover, parts of the processing of the moving target defense may be distributed for better performance, reliability, and/or cost.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the moving target defense remotely into a dynamic memory and send the instructions over the air (e.g. through a wireless cellular network or Wi-Fi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device such as a personal digital assistant (PDA), laptop computer, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in a client device, using a moving target defense against cross-site scripting, the method comprising:
   requesting a web page from a server, wherein the server mutates web content with JavaScript offline to provide N versions of the web page, each with a different mutated version of JavaScript, and wherein, upon the requesting, the server provides one of the N versions of the web page thereby providing the moving target defense against cross-site scripting;
   receiving a response serving the web page from the server with a header comprising an indication of a mutated version of JavaScript for the web page of the N versions of the web page each with a different mutated version and replaced randomly to increase probability of vulnerability detection, wherein the mutated version of JavaScript comprises changes to one or more lexical tokens which are selected based on use in malicious JavaScript attacks, wherein the one or more lexical tokens are one or more of a left parenthesis and an assignment operator, wherein cross-site scripting requires use of the parenthesis or the assignment operator to maliciously manipulate behavior, and wherein the parenthesis or the assignment operator are randomized because they manipulate behavior or state in a cross-site scripting attack;
   adjusting a JavaScript interpreter based on the mutated version of JavaScript for the web page; and
   detecting any JavaScript not conforming to the mutated version of JavaScript and providing an indication of a violation including JavaScript not conforming to the mutated version of JavaScript associated with the web page, wherein the indication includes a page on which the violation occurred, the page's referrer, a resource that violated the page's policy, and a specific directive of the violation.

2. The method of claim 1, further comprising:
   responsive to the detecting, performing one or more of prohibiting any JavaScript not conforming to the mutated version of JavaScript and alerting the server associated with the web page.

3. The method of claim 1, wherein any attack scripts generated from content at run time are not compliant to the mutated version of JavaScript and thus detected as cross-site scripting.

4. The method of claim 1, wherein the web content comprises files with extensions of .HML, .HTML, .JS, .CSS, .PHP, .JSP, and .ASP.

5. The method of claim 1, wherein the requesting, receiving, and adjusting step are performed by a moving target defense compliant browser executed on the client device.

6. The method of claim 1, wherein the client device operates a browser program with a plugin for implementing the requesting, receiving, and adjusting steps.

7. A client device configured to implement a moving target defense against cross-site scripting, the client device comprising:
   a processor; and
   memory storing instructions that, when executed, cause the processor to:
   request a web page from a server, wherein the server mutates web content with JavaScript offline to provide N versions of the web page, each with a different mutated version of JavaScript, and wherein, upon the requesting, the server provides one of the N versions of the web page thereby providing the moving target defense against cross-site scripting;
   receive a response serving the web page from the server with a header comprising an indication of a mutated version of JavaScript for the web page of the N versions of the web page each with a different mutated version and replaced periodically to increase probability of vulnerability detection, wherein the mutated version of JavaScript comprises changes to one or more lexical tokens which are selected based on use in malicious JavaScript attacks, wherein the one or more lexical tokens are one or more of a left parenthesis and an assignment operator, wherein cross-site scripting requires use of the parenthesis or the assignment operator to maliciously manipulate behavior, and wherein the parenthesis or the assignment operator are randomized because they manipulate behavior or state in a cross-site scripting attack, and wherein the web page is randomly reselected from the N versions and replaced periodically by the server;
   adjust a JavaScript interpreter based on the mutated version of JavaScript for the web page; and
   detect any JavaScript not conforming to the mutated version of JavaScript and provide an indication of a violation including JavaScript not conforming to the mutated version of JavaScript associated with the web page, wherein the indication includes a page on which the violation occurred, the page's referrer, a resource that violated the page's policy, and a specific directive of the violation.

8. The client device of claim 7, wherein the instructions that, when executed, further cause the processor to
   responsive to detecting any JavaScript not conforming to the mutated version of JavaScript, perform one or more of prohibit any JavaScript not conforming to the mutated version of JavaScript and alert the server associated with the web page.

9. The client device of claim 7, wherein any attack scripts generated from content at run time are not compliant to the mutated version of JavaScript and thus detected as cross-site scripting.

10. The client device of claim 7, wherein the web content comprises files with extensions of .HML, .HTML, .JS, .CSS, .PHP, .JSP, and .ASP.

11. The client device of claim 7, wherein the instructions comprise a moving target defense compliant browser executed on the client device.

12. The client device of claim 7, wherein the client device operates a browser program with a plugin for implementing adjustments to the JavaScript interpreter.

\* \* \* \* \*